Sept. 3, 1940.   L. P. YOUNG   2,213,438
SOLDERING IRON CONSTRUCTION
Filed Nov. 8, 1938
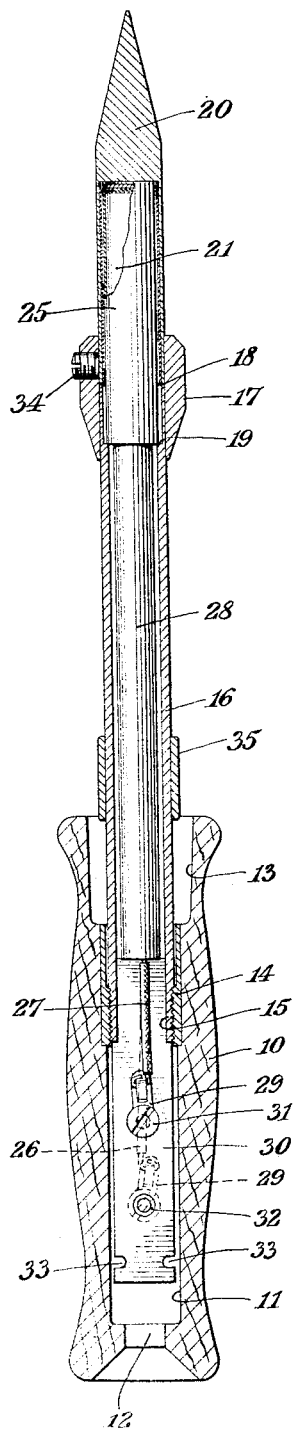
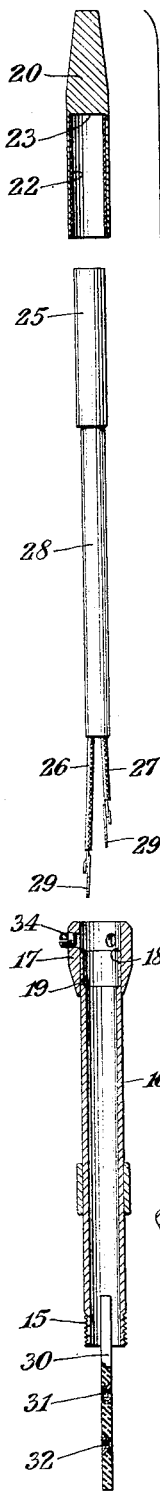
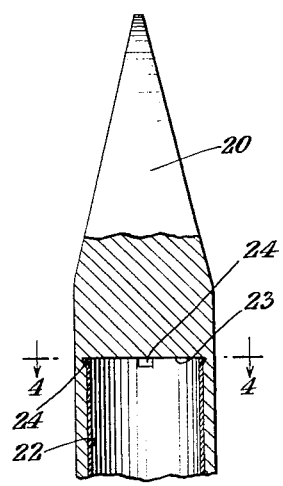
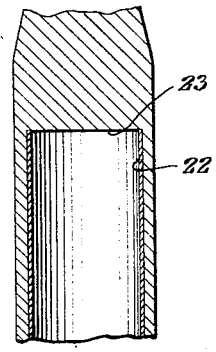
INVENTOR
Leonard P. Young.
BY
his ATTORNEY Patented Sept. 3, 1940

2,213,438

UNITED STATES PATENT OFFICE 2,213,438

SOLDERING IRON CONSTRUCTION

Leonard P. Young, Chester, Conn.

Application November 8, 1938, Serial No. 239,487

8 Claims. (Cl. 219—26)

This invention relates to soldering iron constructions in general, and especially to electric soldering irons wherein the tip as well as the electric heating element are individually removable from the casing of the iron.

One of the objects of this invention is to provide a simple, effective and extremely practical electric soldering iron construction, which may be readily assembled or disassembled and which will have the advantage of permitting an almost instantaneous exchange of either the tip or the heating element, in case either one of these two instrumentalities becomes damaged, or otherwise is rendered unsuitable for further use.

Another object of this invention is to so construct the heatable instrumentality of my device, that is the tip, and the heating instrumentality therefor, that is the element, that the latter may be readily separated from the former, even after a prolonged use of the device.

The foregoing and still further objects and important advantages of my invention will become more readily apparent from the following description of my device, in conjunction with the accompanying drawing, which latter, although showing specific structures, are intended to serve more or less for explanatory purposes only, and are by no means designed to limit my invention to the actual details illustrated.

It is well known that the efficiency of electrically heated devices depends upon the effectiveness of the heat transferred from the heating element to the heatable instrumentality. It has been found that in electrically heated devices, especially of the electric soldering iron type, the best results are obtained when the heatable instrumentality is so arranged as to contain within its body the electric heating element. It is also known that electric soldering irons are usually not handled too gently, and that the heating element often is damaged and short circuited in handling, rendering the instrument useless.

In electric soldering irons, with the element contained in the copper tip body, it was also found that although a greater efficiency is achieved by such construction, the copper oxide forming and accumulating in the recess provided for the heating element, will not only increasingly impair or even destroy the usefulness of the element, but will prevent its removal or replacement, which renders the element as well as the tip utterly useless.

To make an electric heating iron efficient in use, one of the essential prerequisites thereof must be the ready, individual replaceability of both the tip and of the electric heating element. In order to achieve that, I have so designed the tip and the element, to prevent the formation of oxides, both within the recess of the tip for housing the element, as well as upon the element itself.

The construction of my device will be more readily understood from the drawing, in which Fig. 1 is an assembly of an electric soldering iron, partially in section, arranged in the presently preferred form in accordance with my invention.

Fig. 2 shows an exploded illustration of the parts of my device.

Fig. 3 is a fragmental illustration of the tip of my device.

Fig. 4 is a cross-sectional view, taken on lines 4—4 of Fig. 3, and

Fig. 5 is an enlarged cross-sectional view of a modified form of my tip.

Referring now specifically to the drawing, numeral 10 denotes a heat insulating, dielectric hollow handle, wherein is provided a cylindrical through passage 11, terminating in a relatively narrow end opening 12, which latter is adapted to accommodate exterior electric conductors leading into the device. The other end of through passage 11 is enlarged at 13, to provide a generous air space about the casing of the device.

Forcibly associated with through passage 11 of handle 10 is an internally threaded nipple or bushing 14, adapted to receive the threaded end 15 of casing 16. At the free end of the casing there is provided a tip receiving socket 17, within which are provided two spaced recesses 18 and 19, intended to serve, respectively, as stops or abutments for the interior ends of the tip 20 and element 21.

Tip 20 is made of good heat conducting material, such as copper, and is provided with a cylindrical recess for housing element 21. The cylindrical wall of the recess is equipped with a thin, cylindrical, oxidation preventing liner 22, which is forcibly driven into the recess and which terminates with its interior end at the flat end 23 of the recess. It is of foremost importance that the liner is so tightly placed against the cylindrical wall portion of the recess as to preclude the creation of an air space between them, which would facilitate the formation of an oxide layer along their contacting surfaces. I prefer to machine the liner and the interior of the recess in such a manner that the liner and the tip may be joined by forced fit.

In order, however, to prevent any inadvertent disengagement between the two parts, I form from the liner material, at the interior end of the liner, prongs or projections 24, which I force into the material of the tip, as clearly seen in Figs. 3 and 4. A similar effect may be achieved by providing a thread at the exterior surface of the liner, and at the interior surface of the recess, and by screwing the liner into the recess. Such construction is not shown in the drawing since it is obvious. Yet its application will effectively prevent the infiltration of air between the liner and the tip material. As material for the liner I prefer to use stainless steel, which in itself does not oxidize an which effectively precludes the oxidation of the interior of the tip recess. Due to the thinness of the liner, the heat transferred to the tip from the heating element will not be seriously affected.

The interior construction of the heating element of my device is somewhat similar to that covered by my Patent No. 2,069,348, issued to me February 2nd, 1937, with the exception that I employ as outer covering of the heating instrumentality, a thin, readily heat conductive metallic shell, also preferably made of stainless steel, and indicated at 25 in the drawing. This shell is of a diameter slightly smaller than the interior diameter of liner 22, and fits fairly snugly into the latter, but is not forced thereinto and may be readily removed.

Extending from the heating element are two leads or terminals 26 and 27 which are of different length and which pass through a dielectric lead insulator 28. Terminals 26 and 27 are provided at their ends with attaching lugs 29, as clearly seen from Figs. 1 and 2.

Forcibly held within the interior or attached threaded end 15 of casing 16 is a flat dielectric member 30, which is provided at 31 and 32 with internally threaded, flanged eyelets for the reception of screws, by means of which lugs 29, and the ends of exterior electric conductors (not shown), passing into the handle of the device, may be readily attached. At the free end of member 30 there are provided notches 33, around which the exterior electric conductors may be knotted or guided for the purpose of better resisting an inadvertent pull exerted upon the electric cord leading from the handle.

From Figs. 1 and 2 it will be observed that my device and all of its parts may be speedily assembled or disassembled, which is one of the important advantages of an efficient electrically heated device. In assembling the different parts, the element is first inserted into casing 16 until the interior end of shell 25 abuts with inner recess 19, provided within socket 17 or in the tubing of the casing. The next step is the temporary attachment of lugs 29 to their respective beads 31 and 32 by means of attaching screws. At the same time an electric cord may be passed through opening 12 and through the body of handle 10 far enough to bare its ends, which latter are first fastened in notches 33 of member 30, and are then secured by means of attaching screws beneath lugs 29, whereupon the screws are permanently tightened down.

Now handle 10 is joined with casing 16 by screwing threaded portion 15 of the casing into the threaded bushing 14. Finally, tip 20 is slipped over the protruding end of shell 25 of the heating element, until the interior end of the tip abuts with outer recess 18, provided in socket 17. Thereupon the screws 34 of the socket are tightened against the inserted portion of the tip. Thus, the entire assembly of the device is finished.

I preferably provide in the socket three equally spaced set screws for firmly holding tip 20 in its proper relation to socket 17. I also preferably provide a gripping collar 35 over the body of casing 16, near the recessed portion 13 of handle 10. By means of this gripping collar the attachment of the casing with, or its removal from the handle is facilitated.

While I am well aware of the existence of electric soldering irons provided either with casings surrounding the heating element, for the protection of the latter, or with liners associated with the tip of a soldering iron, I verily believe myself to be the first who employs a heatable instrumentality, such as a tip, which is provided with a cylindrical recess for receiving a heating element, and wherein a cylindrical liner is forcibly united with the interior cylindrical surface of the tip, and wherein the element is completely encased in a metal shell, adapted to snugly fit into, but being readily removable from the liner, and wherein both the liner as well as the shell prevent the formation of oxide, which would obstruct or make impossible the removal of the element from the recess intended to house the element.

I further believe that I am the first to provide a construction of electrically heated irons with a readily removable and a readily replaceable tip and heating element, and wherein either the tip or the heating element may be individually disassociated from the rest of the structure, or may be separated from one another, whenever desired, without the employment of any more complicated tools than that of a simple screw driver.

The above advantages will be readily appreciated by those skilled in the art, inasmuch as they know of the very often occurring necessity of replacing worn out tips or defective heating elements. The breakdown of either usually requires the discard of the entire tool.

While I have shown in the drawing a specific construction of my iron, it is readily evident that the same principles involved are applicable to other electrically heated devices, and that due to the various employments of such devices, their construction may require adaptation to their specific use, and therefore changes in their arrangement, in consequence whereof I reserve for myself the right to make such changes and improvements as may be required, without departing from the broad scope of my invention, defined in the annexed claims.

I claim:

1. In an electric soldering iron, a handle provided with a through passage, the latter terminating at one end in a reduced, conductor receiving opening, the other end of the passage being enlarged to form an air space about the casing of the device, an internally threaded casing receiving member forcibly lodged in said handle passage, a casing removably secured to said member at one end, its other end terminating in a tip receiving socket, means for removably holding a tip in the socket, means provided in the socket for limiting the inward position of a tip and of a heating element, a tip removably secured in the socket and having a cylindrical recess, the latter being provided with a thin, cylindrical, oxidation resisting liner forcibly held in said tip, an electric heating element, fully encased in a thin metal shell, removably associated with said tip and filling the major part of its recess, a dielectric terminal insulator extending from the element substantially throughout said casing, a dielectric member forcibly held in the attached end of the casing and extending into the passage of the handle and having spaced, terminal attaching means, electric terminals of different length leading from the element through said insulator and detachably secured to said dielectric member, the latter being provided with means for holding exterior conductors against disengagement from the iron.

2. In an electric soldering iron, a hollow handle, casing attaching means within said handle, a casing removably associated with said attaching means, an enlarged tip receiving socket at the free casing end, a pair of spaced stops provided in said socket, a tip removably secured in said socket and bearing against one of its stops, a cylindrical element-receiving recess in said tip, a thin, oxidation resisting liner forcibly united with the cylindrical wall of the recess, a shell-enclosed electric heating element within the liner-equipped recess of the tip and abutting with the second stop of the socket, a dielectric member in forcible engagement with, and extending beyond the attached end of the casing and into the hollow handle, a pair of spaced means, for connecting electric leads and conduits, provided in said member, and means for holding exterior conduits against disengagement from the iron.

3. In an electric soldering iron, the combination with a casing, of a removable and replaceable tip and heating element construction, consisting of a cylindrically recessed tip, held in the casing and having a thin, oxidation resisting cylindrical lining forcibly associated with the cylindrical wall portion of the recess, and a metal shell encased cylindrical heating element held in said recess, the forcible association of the lining with the tip interior being provided by means of projections of the interior lining end which are forced into and engaging the material of the tip.

4. In an electric soldering iron, the combination with a casing having an enlarged tip and element receiving socket, of a removable and replaceable tip and an electric heating element held in the socket, said socket having two spaced recesses designed to form stops for the tip and the heating element, said tip being provided with a cylindrical recess and a thin, oxidation resisting liner forcibly held therein, said element being cylindrical in shape and having a metal casing completely enclosing it, said tip being in engagement with one of the recesses of the socket, said element filling the lined recess of the tip and being in engagement with the other recess of the socket, and means in said socket for securely holding the tip therein, thereby holding the element in its desired relation in respect to the tip.

5. An electric soldering iron having individually replaceable tip and element structures, consisting, in part, of a casing provided with a relatively large-bodied socket having two spaced recesses, a tip removably associated with said socket and adapted to abut with one of the recesses, a cylindrical recess provided in the tip body, a liner of thin, oxidation resisting metal forcibly secured to the cylindrical wall portion of the tip recess, an electric heating element, encased in a cylindrical shell, within said tip recess and engaging with its outer end the other recess of said socket.

6. An electric soldering iron having individually replaceable tip and element structures, consisting in part, of a casing provided with a relatively large-bodied socket having two spaced recesses, a tip removably associated with said socket and adapted to abut with one of the recesses, a cylindrical recess provided in the tip body, a liner of thin, oxidation resisting metal forcibly secured to the cylindrical wall portion of the tip recess, an electric heating element, encased in a cylindrical shell, within said tip recess and engaging with its outer end the other recess of said socket, said liner having lips or prongs forced out from its interior end into the material of the tip, for preventing an inadvertent, disengagement of the liner from the tip.

7. In an electrically heated device, a heatable instrumentality, a cylindrical recess therein, an oxidation resisting, thin, cylindrical liner forcibly associated with the wall of the recess, the interior end of the liner being in an interlocking engagement with the material of said instrumentality, a cylindrical, shell-enclosed heating element removably associated with, and intended to normally fill the major portion of said recess.

8. An electrically heatable instrumentality having a cylindrical recess for removably accommodating an electric heating element, a thin, cylindrical, oxidation resisting liner forcibly engaging the interior cylindrical surface portion of the recess, and means, forming parts of the interior end edge of the liner in interlocking engagement with the interior end of the recess within the body of the instrumentality.

LEONARD P. YOUNG.